US009714049B2

(12) United States Patent
Hosaka et al.

(10) Patent No.: US 9,714,049 B2
(45) Date of Patent: Jul. 25, 2017

(54) VEHICLE CONTROL DEVICE

(71) Applicant: Nissan Motor Co., Ltd., Yokohama-shi, Kanagawa (JP)

(72) Inventors: Yuuichi Hosaka, Kawasaki (JP); Yuuichi Fukuyama, Yokohama (JP); Shota Miyoshi, Kamakura (JP); Michiharu Gunji, Atsugi (JP); Hiromoto Shimizu, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 39 days.

(21) Appl. No.: 14/436,101

(22) PCT Filed: Oct. 16, 2013

(86) PCT No.: PCT/JP2013/078037
§ 371 (c)(1),
(2) Date: Apr. 16, 2015

(87) PCT Pub. No.: WO2014/073339
PCT Pub. Date: May 15, 2014

(65) Prior Publication Data
US 2015/0260142 A1 Sep. 17, 2015

(30) Foreign Application Priority Data
Nov. 9, 2012 (JP) ................................ 2012-247506

(51) Int. Cl.
*F02N 11/08* (2006.01)
*B62D 5/04* (2006.01)
(Continued)

(52) U.S. Cl.
CPC ........... *B62D 5/046* (2013.01); *B62D 5/0481* (2013.01); *F02D 29/02* (2013.01); *F02N 11/04* (2013.01);
(Continued)

(58) Field of Classification Search
CPC ............... F02N 11/084; F02N 11/0848; F02N 11/0862; F02N 11/087; F02N 2200/06;
(Continued)

(56) References Cited

U.S. PATENT DOCUMENTS 4,562,896 A * 1/1986 Morishita ................ B62D 5/06 180/404
6,938,599 B2 * 9/2005 Senda .................. F02N 11/087 123/179.3
(Continued)

FOREIGN PATENT DOCUMENTS

CN 102575597 A 7/2012
EP 2484884 A1 8/2012
(Continued)

*Primary Examiner* — Sizo Vilakazi
*Assistant Examiner* — Kevin R Steckbauer
(74) *Attorney, Agent, or Firm* — Global IP Counselors, LLP

(57) ABSTRACT

When an engine is to be restarted, a power-steering mechanism is reactivated once a battery voltage has reached at least a predetermined voltage at which the power-steering mechanism normally operates after the resistance of a power supply circuit is switched by the circuit switching device, after startup of the engine has been initiated.

3 Claims, 14 Drawing Sheets

START
S41 IDLING STOP CONDITION FULFILLED? NO / YES
S42 ENGINE STOP
S43 STEERING ASSISTANCE STOP
S44 IDLING STOP CANCEL CONDITION FULFILLED? NO / YES
S45 CRANKING INITIATED BY STARTER MOTOR
S51 STEERING ASSISTANCE REMAINS STOPPED
S46 STARTER BYPASS RELAY SWITCHED FROM ON TO OFF? NO / YES
S47 BATTERY VOLTAGE > PREDETERMINED VOLTAGE? NO / YES
S48 STEERING ASSISTANCE RESTARTED
S49 HAS ENGINE REACHED COMPLETE COMBUSTION? NO / YES
S50 CRANKING ENDED
END

(51) Int. Cl.
*F02D 29/02* (2006.01)
*F02N 11/04* (2006.01)

(52) U.S. Cl.
CPC ........ *F02N 11/087* (2013.01); *F02N 11/0818* (2013.01); *F02N 2200/024* (2013.01); *F02N 2200/063* (2013.01); *F02N 2200/101* (2013.01); *F02N 2200/102* (2013.01); *F02N 2250/02* (2013.01); *Y02T 10/48* (2013.01)

(58) Field of Classification Search
CPC ....... F02N 2200/063; F02N 2200/0808; B62D 5/0457
See application file for complete search history.

(56) References Cited

U.S. PATENT DOCUMENTS 8,538,632 B2 * 9/2013 Takamatsu ........... B62D 5/0457 180/443
9,043,119 B2 * 5/2015 Horii ....................... F02D 29/02 701/102
9,249,771 B2 * 2/2016 Kamiya .............. F02N 11/0833
2004/0168664 A1 * 9/2004 Senda ................... F02N 11/087 123/179.3
2009/0150027 A1 * 6/2009 Takamatsu ........... B62D 5/0457 701/41
2011/0046864 A1 * 2/2011 Kamiya .............. F02N 11/0833 701/102
2011/0128662 A1 * 6/2011 Kato ..................... B60L 3/0069 361/166
2012/0185150 A1 * 7/2012 Horii ....................... F02D 29/02 701/102
2013/0253766 A1 9/2013 Kimura

FOREIGN PATENT DOCUMENTS

JP 2004-308645 A 11/2004
JP 2005-67414 A 3/2005
JP 2005067414 A * 3/2005 ............... B62D 5/04
JP 2005-240582 A 9/2005
JP 2006-138426 A 6/2006
JP 2008-105522 A 5/2008
JP 2008-238913 A 10/2008
JP 2010-248964 A 11/2010
WO 2012/144069 A1 10/2012

* cited by examiner

COMPLETE COMBUSTION DETERMINATION SPEED
ENGINE SPEED
0rpm
ENGINE DRIVE STATE
CRANKING
ENGINE RUN
IGNITION ON STALL
IGNITION OFF
IDLING STOP CONTROL STATE
DURING IDLING STOP
DURING RESTART
ENGINE RUN
SSG OPERATING STATE
ON
OFF
STEERING ASSISTANCE ALLOWANCE
PROHIBITED
ALLOWED
BATTERY VOLTAGE
EPS NORMAL OPERATION ENABLING VOLTAGE
t1
t2
t3
t4
t5
t6
t3t4

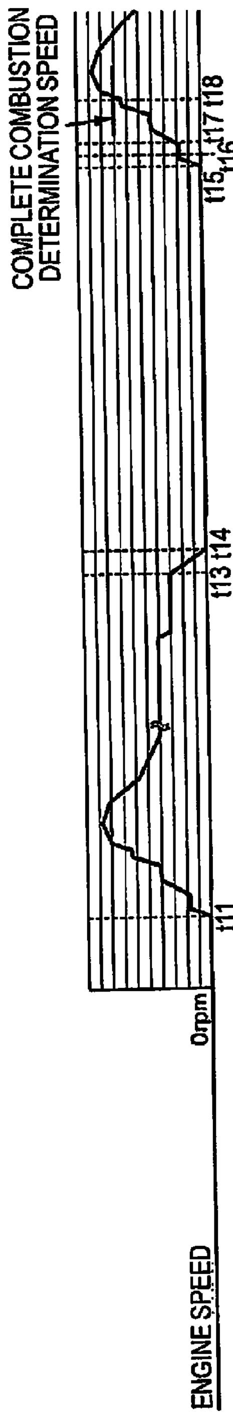
FIG. 8A
FIG. 8B
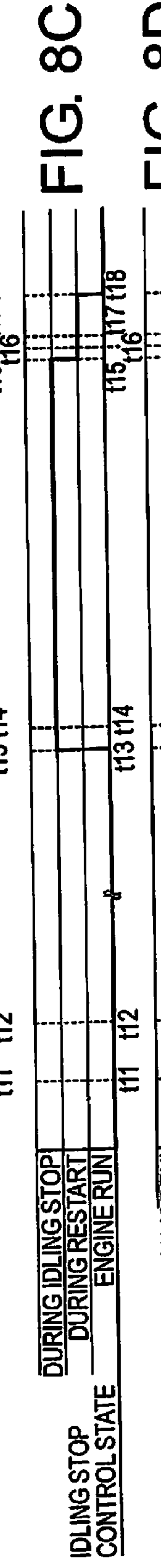
FIG. 8C
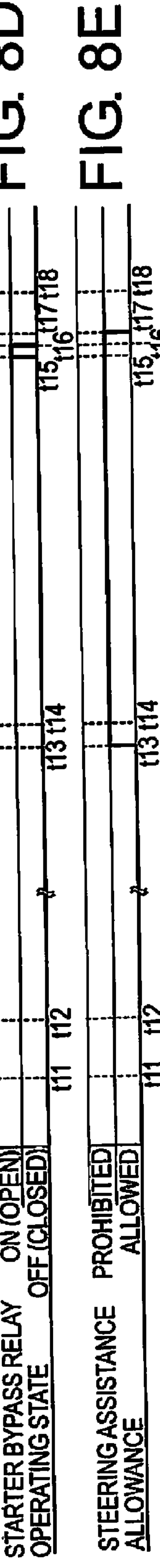
FIG. 8D
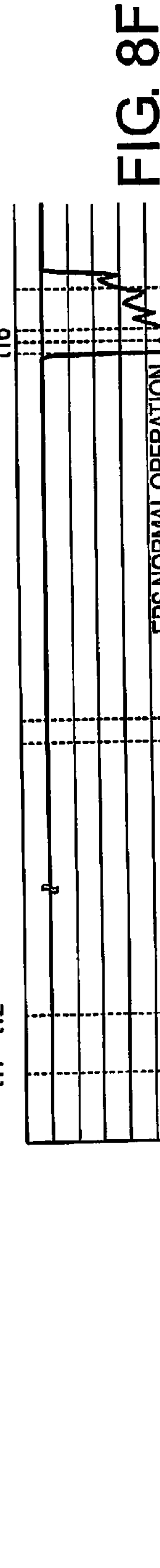
FIG. 8E
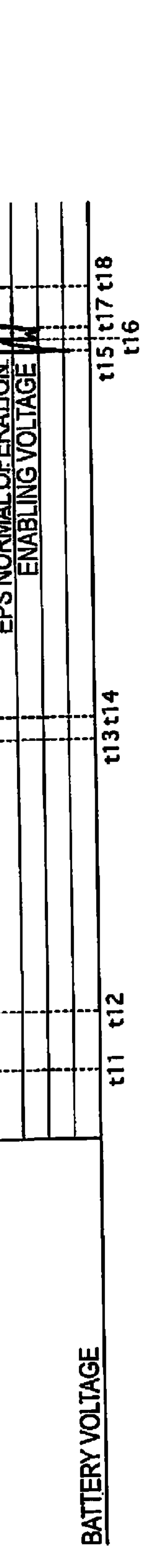
FIG. 8F

VEHICLE CONTROL DEVICE

CROSS-REFERENCE TO RELATED APPLICATIONS

This application is a U.S. National stage application of International Application No. PCT/JP2013/078037, filed Oct. 16, 2013, which claims priority to JP Patent Application No. 2012-247506 filed on Nov. 9, 2012, the contents of each of which are hereby incorporated herein by reference.

BACKGROUND

Field of the Invention

The present invention relates to a vehicle control device.

Background Information

Japanese Laid-Open Patent Application No. 2010-248964 discloses a device in which power stops being supplied to a power steering motor in the event of a transition to an idling stop.

SUMMARY

Japanese Laid-Open Patent Application No. 2010-248964 does not disclose subject matter concerning the timing at which power starts to be supplied once more to a power steering motor when an engine is restarted after an idling stop. After the engine has restarted, it has not always been possible to impart assist torque to the steering torque of the driver when the vehicle begins to move.

The present invention focuses on the above problem, it being an object of the invention to provide a vehicle control device that can quickly impart assist torque to the steering torque of the driver by a power-steering mechanism after the engine has restarted.

In order to achieve the above objective, according to the present invention, when an engine is to be restarted, a power-steering mechanism is reactivated when the voltage of a battery is at least a predetermined voltage after the resistance of a power supply circuit has been switched by a circuit switching device before complete combustion is reached, after startup of the engine has been initiated.

Consequently, the power-steering mechanism is reactivated while voltage fluctuations of the battery are stable, and assist torque can therefore be quickly and stably outputted after idling stop control has been canceled.

BRIEF DESCRIPTION OF THE DRAWINGS

Referring now to the attached drawings which form a part of this original disclosure.

FIGS. 8A-8F are time charts from engine startup to an engine restart following an idling stop in Embodiment 1.

DETAILED DESCRIPTION OF EMBODIMENTS

Reference Example 1

Figure 1:
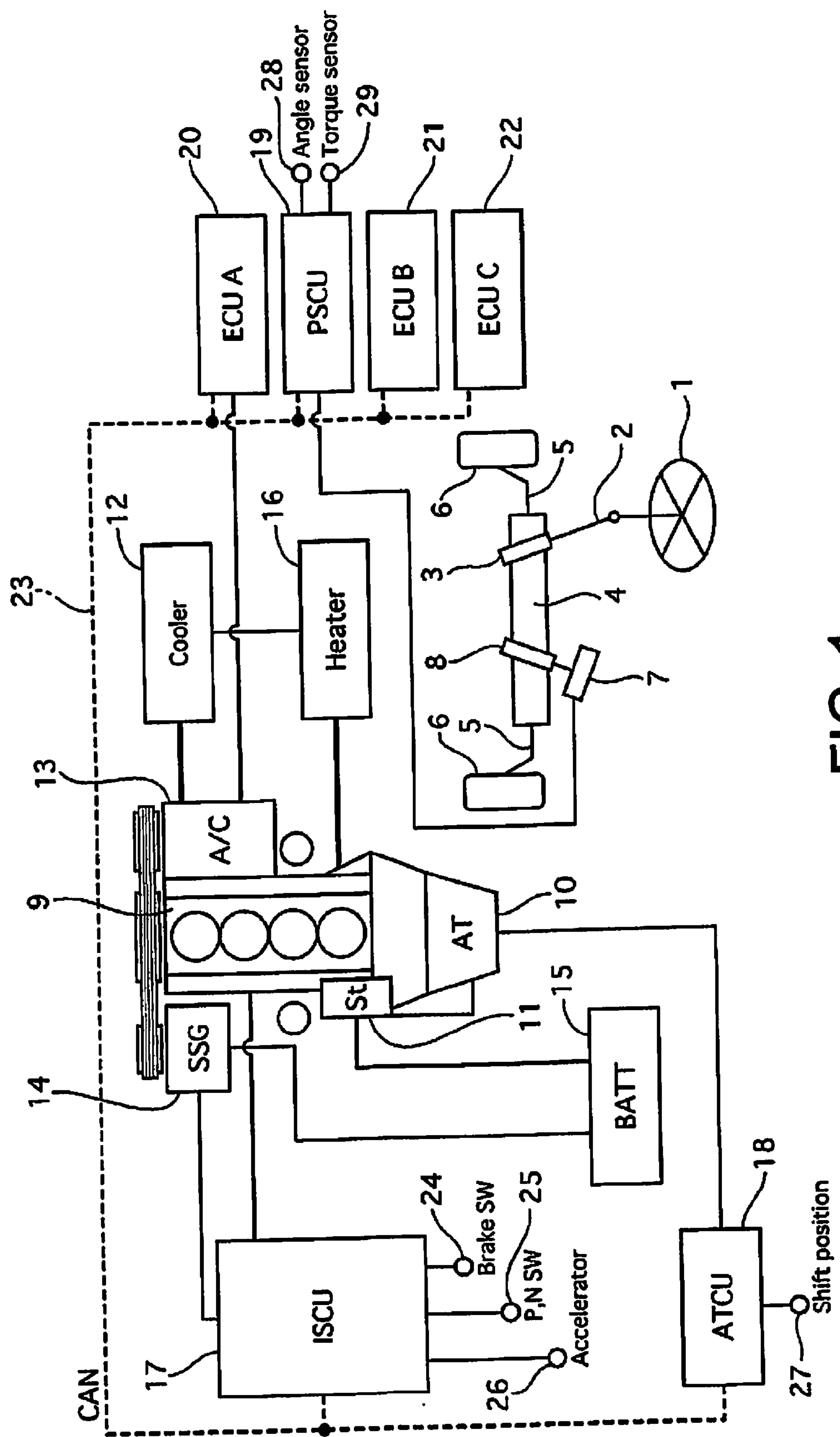
FIG. 1 is a schematic diagram of a vehicle system according to Reference Example 1.

FIG. 1 is a schematic diagram of a vehicle system equipped with power steering and idling stop.

This vehicle system has, as a steering mechanism, a steering wheel 1, a steering shaft 2 connected to the steering wheel 1, a pinion 3 that rotates integrally with the steering shaft 2, a rack 4 for converting the rotational motion of the pinion 3 into linear motion in the vehicle width direction, tie rods 5 connected to both ends of the rack 4, and steered wheels 6 that are connected to the tie rods 5 and that perform steering in accordance with the steered amount of the steering wheel 1. The vehicle system also has, as a power-steering mechanism, an assist motor 7 for outputting assist torque that supplements the steering torque of the driver, and a pinion 8 that rotates integrally with a motor shaft of the assist motor 7 and meshes with the rack 4.

The vehicle system also has an engine 9 as a drive source, and the drive force of the engine 9 is outputted to an automatic transmission 10. The engine 9 includes a starter motor 11 for cranking the engine 9 when the engine starts up. Also included is a compressor 13 connected via a belt with a crankshaft of the engine 9. The compressor 13, which is operated by the engine 9, compresses a catalyst of a cooler 12 for sending cold air into a passenger compartment. Also included is a side mounted starter generator (SSG) 14 connected via a belt with the crankshaft of the engine 9. The SSG 14 cranks the engine 9 when the engine starts up, and the SSG is operated by the engine 9 to generate power after the engine has started up. The starter motor 11 and the SSG 14, which are connected to a battery 15, use the power of the battery 15 to crank the engine when the engine starts up. The SSG 14 stores the power generated after the engine has started up in the battery 15. The engine 9 is connected to a heater 16 for sending hot air into the passenger compartment, and the heater 16 utilizes the heat of the engine 9.

The configuration of the control system includes an idling stop control unit 17, an automatic transmission control unit 18, and a power steering control unit 19. These along with other electronic control units 20, 21, 22 share information through a controller area network (CAN) 23.

Connected to the idling stop control unit 17 are a brake switch 24 for outputting information on whether or not a brake pedal is being operated, a PN switch 25 for outputting information on whether or not the shift position is P (park) or N (neutral), and an accelerator position sensor 26 for outputting information on an accelerator pedal position. An inhibitor switch 27 showing the shift position is connected to the automatic transmission control unit 18. Connected to the power steering control unit 19 are a steering angle sensor 28 for detecting the steering angle of the steering wheel 1, and a steering torque sensor 29 for detecting the steering torque inputted to the steering wheel 1.

Idling Stop Control

Figure 2:
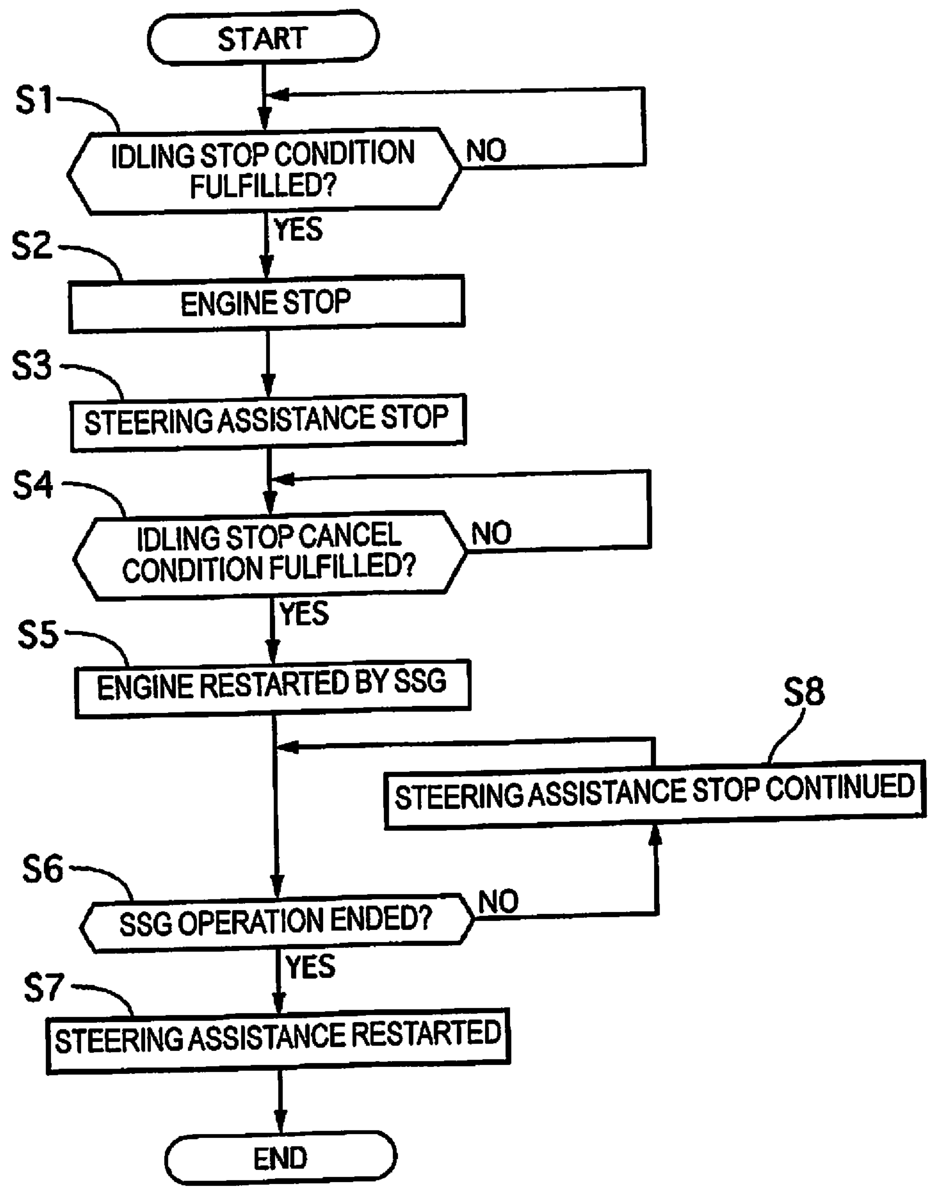
FIG. 2 is a flowchart illustrating the steps of Reference Example 1.

Next, idling stop control is described. FIG. 2 is a flowchart showing the flow of control performed in the idling stop control unit 17 and the power steering control unit 19.

In step S1, a determination is made as to whether or not a condition is fulfilled for stopping the engine and entering idling stop control. When the condition is fulfilled, the process advances to step S2, and when the condition is not fulfilled, the determination of step S1 is repeated until the condition is fulfilled. The idling stop condition includes conditions such as the vehicle speed being zero, the accelerator pedal position being zero, the brake pedal being pressed, the engine oil or transmission oil being at least a predetermined temperature, and the battery voltage being at least a predetermined voltage, and when these conditions are all fulfilled, the idling stop condition is fulfilled. Other conditions may be added to the idling stop condition, which is not particularly limited.

In step S2, the supply of fuel to the engine is stopped, and the process advances to step S3. The language "engine stop" or "the engine stops" hereinafter refers to a state in which the supply of fuel to the engine has stopped, and, as shall be apparent, includes states in which the engine is not rotating, but also includes states in which the supply of fuel has stopped and the engine is rotating by inertia.

In step S3, the assist motor 7 stops generating assist torque (steering assistance stops), and the process advances to step S4.

In step S4, a determination is made as to whether or not an idling stop cancel condition is fulfilled. When the condition is fulfilled, the process advances to step S5, and when the condition is not fulfilled, the determination of step S4 is repeated until the condition is fulfilled. The idling stop cancel condition includes conditions such as the accelerator pedal position being greater than zero, the pressing of the brake pedal having been lessened, the engine oil or the transmission oil being less than a predetermined temperature, and the battery voltage being less than a predetermined voltage, and when any of these conditions is fulfilled, the idling stop cancel condition is fulfilled. Other conditions may be added to the idling stop cancel condition, which is not particularly limited.

In step S5, the engine 9 is cranked by the SSG 14, and the process advances to step S6.

In step S6, a determination is made as to whether or not the operation of the SSG 14 has ended. When the operation has ended, the process advances to step S7, and when the operation has not ended, the process advances to step S8. The SSG 14 ends operation when it is determined that the engine 9 has reached complete combustion. The determination that the engine 9 has reached complete combustion is made when the engine speed is equal to or greater than a speed that enables self-sustaining rotation (complete combustion determination speed: 500 [rpm], for example). With the determination that the operation of the SSG 14 has ended, the voltage fluctuation of the battery 15 can be determined to be equal to or less than the predetermined fluctuation range.

In step S7, the assist motor 7 begins again to generate assist torque (steering assistance is restarted), and the process is ended.

In step S8, the assist motor 7 continues to not generate assist torque (the stopping of steering assistance is continued), and the process advances to step S6.

Operation of Idling Stop Control Process

When the idling stop condition is fulfilled, the process advances from step S1 to step S2 and step S3, the supply of fuel to the engine is stopped, and steering assistance is stopped.

After the engine stop (idling stop), when the idling stop cancel condition is fulfilled, the process advances from step S4 to step S5, the SSG 14 is operated, and the engine 9 is cranked.

When the SSG 14 is operating even after the idling stop cancel condition has been fulfilled, the process advances from step S6 to step S8, and steering assistance remains stopped.

When the idling stop cancel condition has been fulfilled and operation of the SSG 14 is ended, the process advances from step S6 to step S7 and steering assistance is restarted.

Action

Due to steering assistance being stopped when the idling stop condition is fulfilled, power consumption of the battery 15 can be suppressed. Due to steering assistance being restarted when the idling stop is canceled, assist torque can be generated for the steering torque of the driver when travel is restarted.

Figure 3:
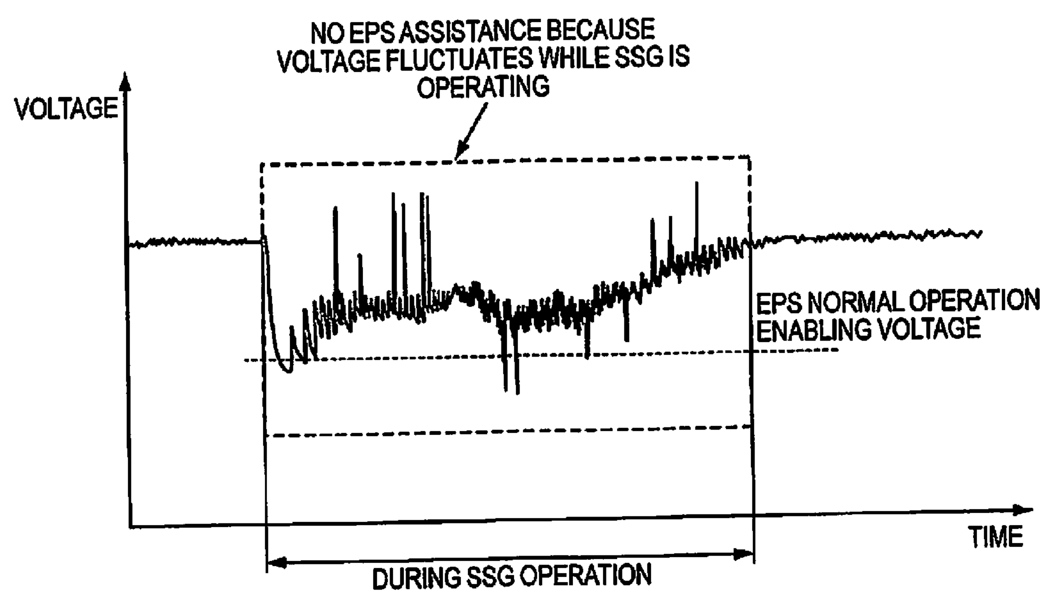
FIG. 3 is a time chart showing the change in battery voltage when the engine is restarted in Reference Example 1.

When the idling stop cancel condition is fulfilled, the engine 9 is started up by the SSG 14. The SSG 14 uses the power of the battery 15 when cranking the engine 9. FIG. 3 is a time chart showing the change in battery voltage before and after the battery is restarted. When the SSG 14 cranks the engine 9, the voltage fluctuation is greater than before and after cranking, as shown in FIG. 3. Therefore, during cranking, the voltage is sometimes equal to or less than a power steering normal operating voltage (a voltage at which the assist motor 7 can stably generate sufficient assist torque).

In view of this, in Reference Example 1, steering assistance remains stopped when the SSG 14 is operating and the battery voltage fluctuation is large, and steering assistance is restarted after the SSG 14 stops and the battery voltage fluctuation decreases.

Figures 4A, 4B, 4C, 4D, 4E, 4F:
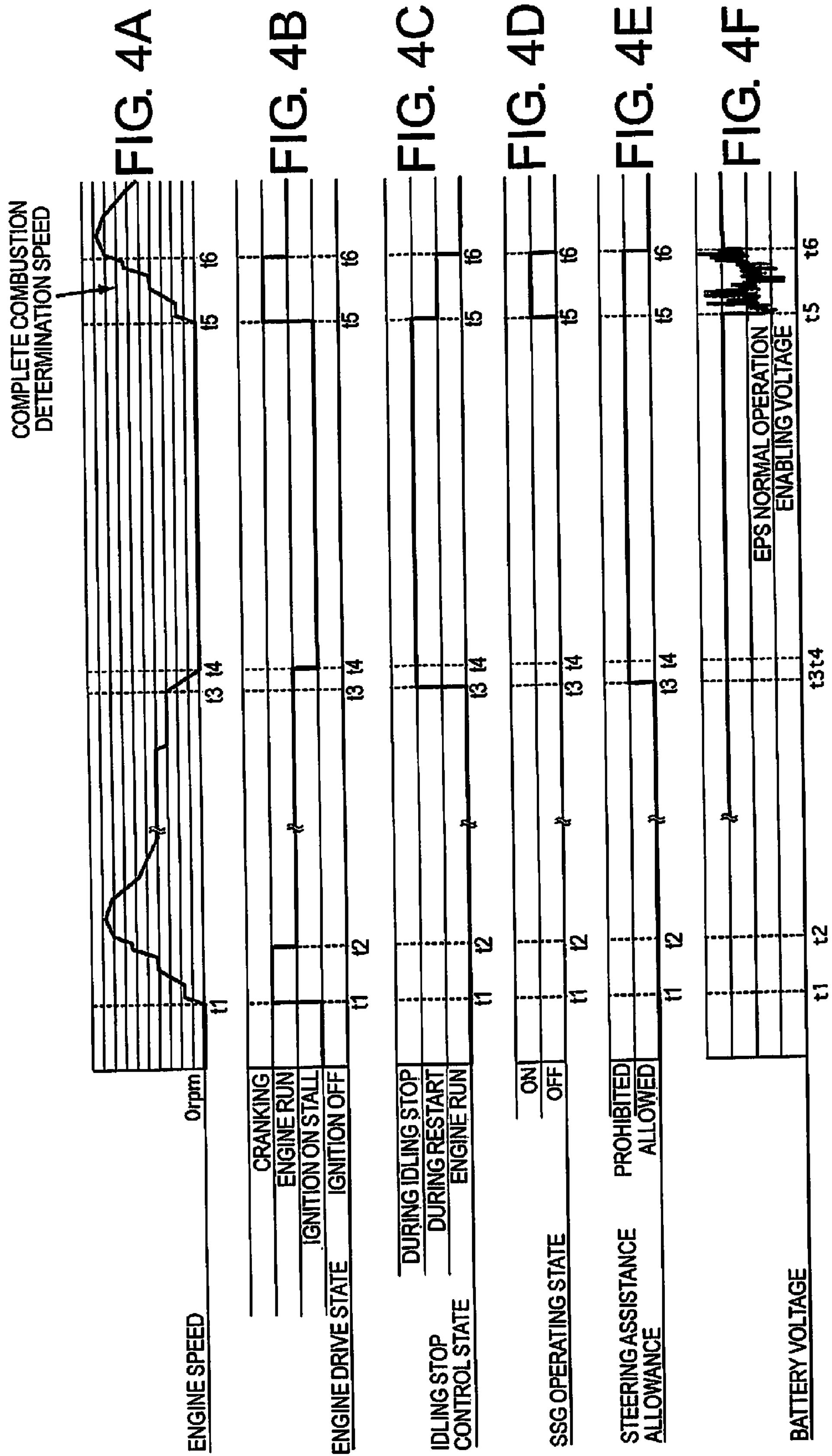
FIGS. 4A-4F are time charts from engine startup to an engine restart following an idling stop in Reference Example 1.

FIGS. 4A-F are time charts from engine startup through an idling stop until an engine restart. FIG. 4A shows the engine speed, FIG. 4B shows the operating state of the engine 9, FIG. 4C shows the state of idling stop control, FIG. 4D shows the operating state of the SSG 14, FIG. 4E shows the state of steering assistance, and FIG. 4F shows the battery voltage.

At time t1, the ignition switch is operated and the engine 9 is cranked. The engine 9 is operated by the starter motor 11 at this time.

At time t2, cranking by the starter motor 11 ends and self-sustained rotation of the engine 9 is begun.

At time t3, the supply of fuel to the engine is stopped because idling stop control is initiated when the idling stop condition is fulfilled. Steering assistance is also prohibited (stopped).

At time t4, the engine rotation stops.

At time t5, when the idling stop cancel condition is fulfilled, such as, for example, the pressing of the brake pedal being released, idling stop control is canceled, and the engine 9 is cranked by the SSG 14.

When the engine has reached complete combustion at time t6, the SSG 14 ends operation, the battery voltage fluctuation decreases, and the battery voltage becomes equal to or greater than the power steering normal operating voltage. Therefore, steering assistance is allowed (restarted).

Effects

The effects of Reference Example 1 are described.

(1) The vehicle control comprises the assist motor 7 (power-steering mechanism) for imparting assist torque to steering torque of a driver, the SSG 14 (engine startup means or device) for using the power of the battery 15 to start up the engine 9, the idling stop control unit 17 (idling stop control means or unit) for stopping the engine 9 when the vehicle stops and restarting the engine 9 when the vehicle begins to move, and the power steering control unit 19 (power-steering control means or controller) for controlling the assist motor 7 so as to generate assist torque corresponding to the steering maneuver performed by the driver; wherein the power steering control unit 19 stops generating the assist torque through the assist motor 7 when the engine 9 has stopped, and reactivates the assist motor 7 when fluctuation in the battery voltage 15 is equal to or less than a predetermined fluctuation range, after engine 9 startup has been initiated when the engine 9 is being restarted.

Consequently, the assist motor 7 is operated while the voltage fluctuation of the battery 15 is stable, and assist torque can therefore be quickly and stably outputted after the idling stop control has been canceled.

(2) The power steering control unit 19 determines that the voltage fluctuation of the battery 15 is equal to or less than the predetermined fluctuation range when the engine 9 startup is complete and the SSG 14 has stopped.

Consequently, the assist motor 7 is operated when the voltage of the battery 15 has been sufficiently restored, and assist torque can therefore be quickly and sufficiently outputted after the idling stop control has been canceled.

Embodiment 1

In Reference Example 1, the engine 9 is cranked by the SSG 14 when the engine is restarted after idling stop control is canceled. In Embodiment 1, the engine 9 is cranked by the starter motor 11 even when the engine is restarted after idling stop control is canceled. In Embodiment 1, a starter bypass relay 31 is provided between the battery 15 and the starter motor 11.

Figure 5:
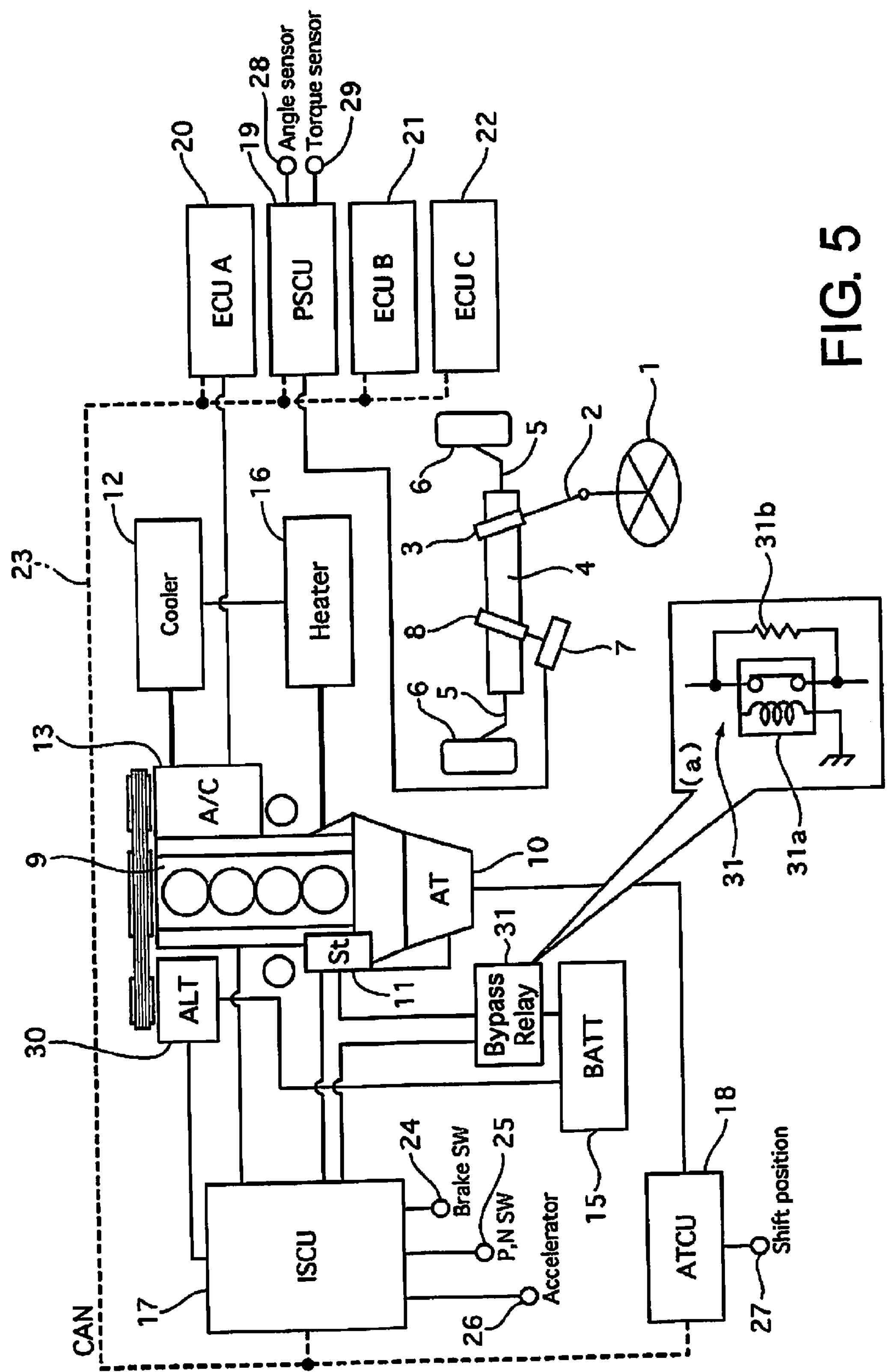
FIG. 5 is a schematic diagram of a vehicle system according to Embodiment 1.

FIG. 5 is a schematic diagram of a vehicle system equipped with power steering and idling stop.

This vehicle system has, as a steering mechanism, a steering wheel 1, a steering shaft 2 connected to the steering wheel 1, a pinion 3 that rotates integrally with the steering shaft 2, a rack 4 for converting the rotational motion of the pinion 3 into linear motion in the vehicle width direction, tie rods 5 connected to both ends of the rack 4, and steered wheels 6 that are connected to the tie rods 5 and that perform steering in accordance with the steered amount of the steering wheel 1. The vehicle system also has, as a power-steering mechanism, an assist motor 7 for outputting assist torque that supplements the steering torque of the driver, and a pinion 8 that rotates integrally with a motor shaft of the assist motor 7 and meshes with the rack 4.

The vehicle system also has an engine 9 as a drive source, and the drive force of the engine 9 is outputted to an automatic transmission 10. The engine 9 includes a starter motor 11 for cranking the engine 9 when the engine starts up. Also included is a compressor 13 connected via a belt with a crankshaft of the engine 9. The compressor 13, which is operated by the engine 9, compresses a catalyst of a cooler 12 for sending cold air into a passenger compartment. Also included is an alternator 30 connected via a belt with the crankshaft of the engine 9. After engine startup, the alternator 30 is operated by the engine 9 to generate power.

The starter bypass relay 31 is disposed between the starter motor 11 and the battery 15. The starter bypass relay 31 is formed from a relay circuit 31*a* and a resistor circuit 31*b* disposed in parallel to the relay circuit 31*a*. Normally, the starter bypass relay 31 is off and the relay circuit 31*a* is closed. At this time, electric current flows through the relay circuit 31*a* and does not flow to the resistor circuit 31*b*. When the engine is cranked by the starter motor 11, the starter bypass relay 31 is turned on and the relay circuit 31*a* is opened. At this time, electric current does not flow to the relay circuit 31*a* and does flow through the resistor circuit 31*b*.

The engine 9 is connected to a heater 16 for sending hot air into the passenger compartment, and the heater 16 utilizes the heat of the engine 9.

The configuration of the control system includes an idling stop control unit 17, an automatic transmission control unit 18, and a power steering control unit 19. These along with other electronic control units 20, 21, 22 share information through a controller area network (CAN) 23.

Connected to the idling stop control unit 17 are a brake switch 24 for outputting information on whether or not a brake pedal is being operated, a PN switch 25 for outputting information on whether or not the shift position is P (park) or N (neutral), and an accelerator position sensor 26 for outputting information on an accelerator pedal position. An inhibitor switch 27 showing the shift position is connected to the automatic transmission control unit 18. Connected to the power steering control unit 19 are a steering angle sensor 28 for detecting the steering angle of the steering wheel 1, and a steering torque sensor 29 for detecting the steering torque inputted to the steering wheel 1.

Idling Stop Control

Figure 6:
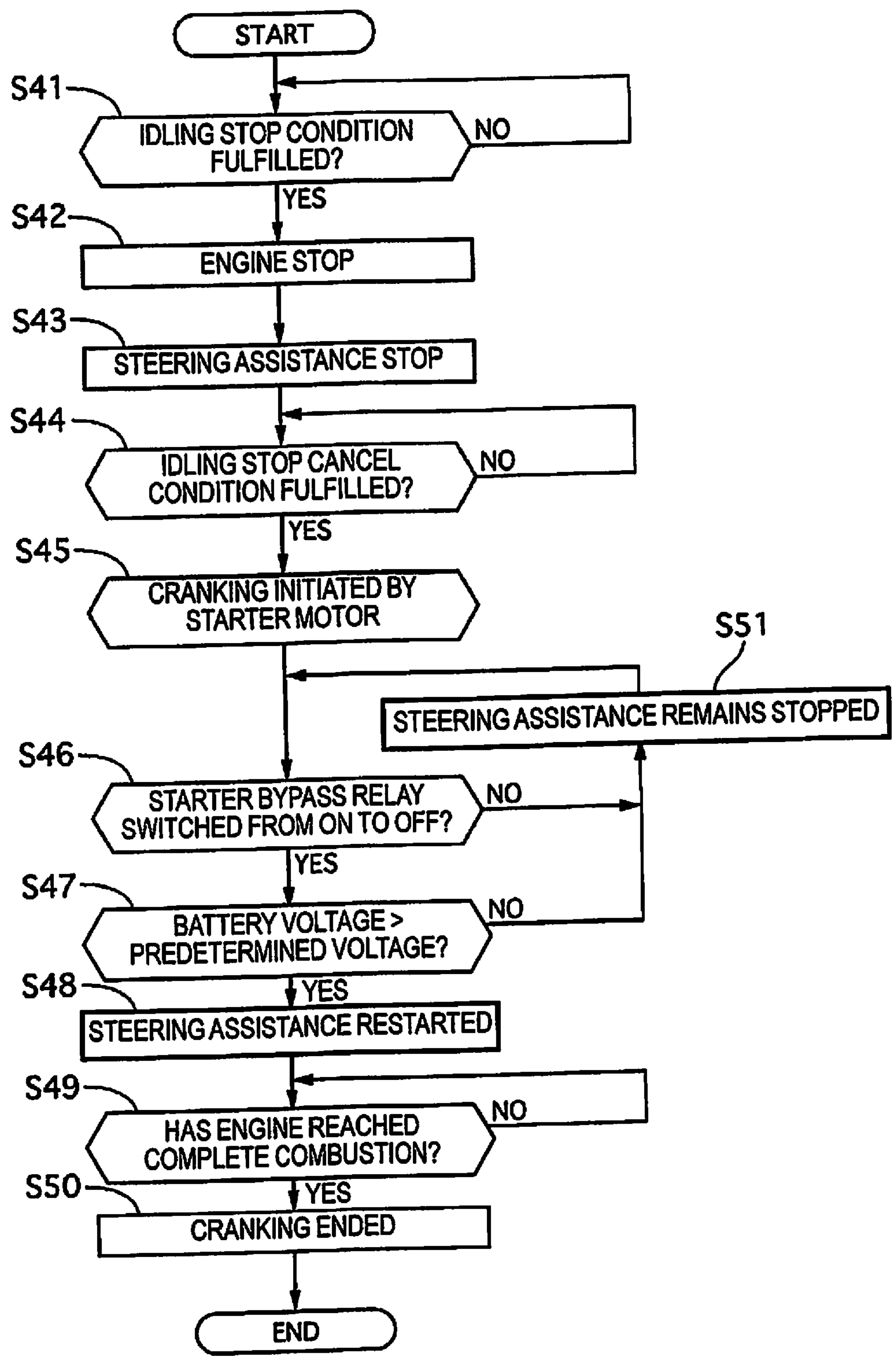
FIG. 6 is a flowchart illustrating the steps of Embodiment 1.

Next, idling stop control is described. FIG. 6 is a flowchart showing the flow of control performed in the idling stop control unit 17 and the power steering control unit 19.

In step S41, a determination is made as to whether or not a condition is fulfilled for stopping the engine and entering idling stop control. When the condition is fulfilled, the process advances to step S42, and when the condition is not fulfilled, the determination of step S41 is repeated until the condition is fulfilled. The idling stop condition includes conditions such as the vehicle speed being zero, the accelerator pedal position being zero, the brake pedal being pressed, the engine oil or transmission oil being at least a predetermined temperature, and the battery voltage being at least a predetermined voltage, and when these conditions are all fulfilled, the idling stop condition is fulfilled. Other conditions may be added to the idling stop condition, which is not particularly limited.

In step S42, the supply of fuel to the engine is stopped, and the process advances to step S43.

In step S43, the assist motor 7 stops generating assist torque (steering assistance stops), and the process advances to step S44.

In step S44, a determination is made as to whether or not an idling stop cancel condition is fulfilled. When the condition is fulfilled, the process advances to step S45, and when the condition is not fulfilled, the determination of step S44 is repeated until the condition is fulfilled. The idling stop cancel condition includes conditions such as the accelerator pedal position being greater than zero, the pressing of the brake pedal having been lessened, the engine oil or the transmission oil being less than a predetermined temperature, and the battery voltage being less than a predetermined voltage, and when any of these conditions is fulfilled, the idling stop cancel condition is fulfilled. Other conditions may be added to the idling stop cancel condition, which is not particularly limited.

In step S45, the starter bypass relay 31 is turned on (opened), the engine 9 is cranked by the starter motor 11, and the process advances to step S46.

In step S46, a determination is made as to whether or not the starter bypass relay 31 has been switched from on (open) to off (closed). When a switch has been made, the process advances to step S47, and when a switch has not been made, the process advances to step S51.

In step S47, a determination is made as to whether or not the battery voltage is at least a predetermined voltage. When the voltage is at least the predetermined voltage, the process advances to step S48, and when the voltage is less than the predetermined voltage, the process advances to step S49. The predetermined voltage in step S47 is set to a power steering normal operating voltage (a voltage at which the assist motor 7 can stably generate sufficient assist torque).

In step S48, the assist motor 7 again begins to generate assist torque (steering assistance is restarted), and the process advances to step S51.

In step S49, a determination is made as to whether or not the engine 9 has reached complete combustion. When the engine has reached complete combustion, the process advances to step S50, and when the engine has not reached complete combustion, this process is repeated. The determination that the engine 9 has reached complete combustion is made when the engine speed is equal to or greater than a speed that enables self-sustaining rotation (complete combustion determination speed: 500 rpm, for example).

In step S50, the starter motor 11 ceases cranking the engine 9 and the process is ended.

In step S51, the assist motor 7 continues to not generate assist torque (steering assistance remains stopped), and the process advances to step S46.

Operation of Idling Stop Control Process

When the idling stop condition is fulfilled, the process advances from step S41 to step S42 and step S43, the supply of fuel to the engine is stopped, and steering assistance is stopped.

After the engine stop (idling stop), when the idling stop cancel condition is fulfilled, the process advances from step S44 to step S45, the starter bypass relay 31 is turned on (opened), the starter motor 11 is operated, and the engine 9 is cranked.

Even after the idling stop cancel condition has been fulfilled, when the starter bypass relay 31 is turned on (opened), the process advances from step S46 to step S51, and steering assistance remains stopped.

Furthermore, even after the starter bypass relay 31 has been switched from on (open) to off (closed), when the battery voltage is equal to or less than the predetermined voltage, the process advances from step S47 to step S51, and steering assistance remains stopped.

When the idling stop cancel condition is fulfilled, the starter bypass relay 31 is switched from on (open) to off (closed), and the battery voltage is greater than the predetermined voltage, the process advances from step S47 to step S48 and steering assistance is restarted.

When the engine 9 has reached complete combustion after steering assistance is restarted, the process transitions from step S49 to step S50, and the starter motor 11 ceases cranking the engine 9.

Action

Due to steering assistance being stopped when the idling stop condition is fulfilled, power consumption of the battery 15 can be suppressed. Due to steering assistance being restarted when the idling stop is canceled, assist torque can be generated for the steering torque of the driver when travel is restarted.

Figure 7:
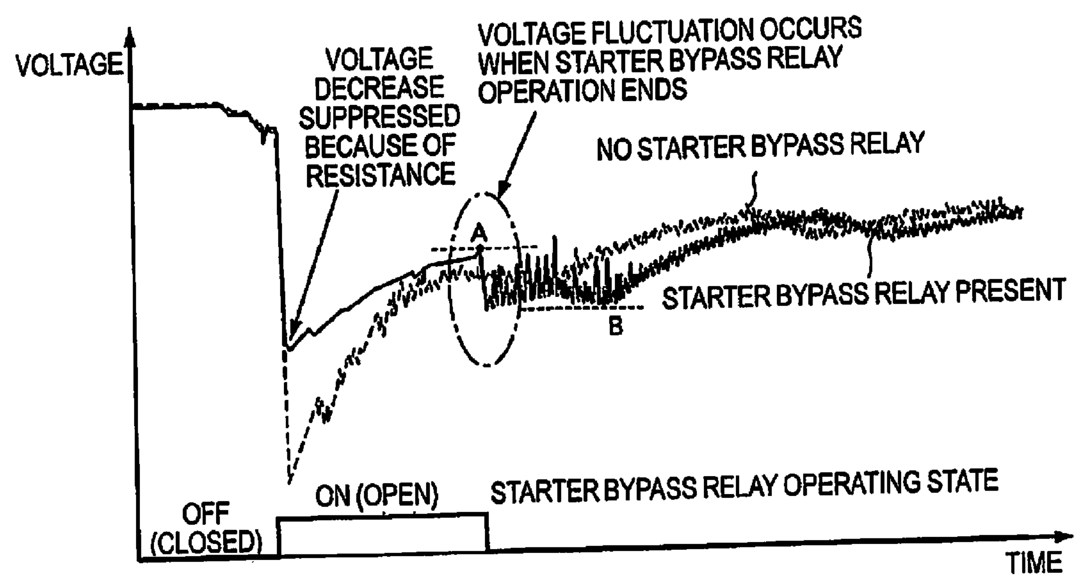
FIG. 7 is a time chart showing the change in battery voltage when the engine is restarted in Embodiment 1.

When the idling stop condition is fulfilled, the starter bypass relay 31 turns on and the engine 9 is started up by the starter motor 11. FIG. 7 is a time chart showing the change in battery voltage before and after the engine is restarted.

When there is no starter bypass relay 31, the voltage rapidly decreases (instantly drops) the instant the starter motor 11 begins to crank the engine 9, as shown in FIG. 7. In view of this, the starter bypass relay 31 is disposed between the battery 15 and the starter motor 11 in Embodiment 1. When cranking is begun, the starter bypass relay 31 is turned on (opened) and electric current flowing from the battery 15 to the starter motor 11 passes through the resistor circuit 31*b*. The instant drop in voltage at the start of cranking can thereby be suppressed as shown in FIG. 7.

When a predetermined time elapses after the start of cranking, the starter bypass relay 31 is switched from on (open) to off (closed), the resistor circuit 31*b* is shorted, and the electric current flowing from the battery 15 to the starter motor 11 passes through the relay circuit 31*a*. The resistor circuit 31*b* can thereby be kept from reaching a high temperature.

When the starter bypass relay 31 is switched from on (open) to off (closed), the voltage fluctuation increases, and the voltage fluctuates between point A and point B in FIG. 7. The voltage is thereafter gradually restored. In other words, immediately after the starter bypass relay 31 is switched from on (open) to off (closed), though the assist motor 7 attempts to generate assist torque, there is a risk that generating sufficient assist torque will not be possible.

In view of this, steering assistance is stopped when the starter motor 11 begins cranking the engine 9 in Embodiment 1. Steering assistance remains stopped even immediately after the starter bypass relay 31 is switched from on (open) to off (closed), and steering assistance is restarted after the voltage of the battery 15 reaches the predetermined voltage or greater.

FIGS. 8A-F from engine startup through an idling stop until the engine is restarted. FIG. 8A shows the engine speed, FIG. 8B shows the operating state of the engine 9, FIG. 8C shows the state of idling stop control, FIG. 8D shows the operating state of the starter bypass relay 31, FIG. 8E shows the state of steering assistance, and FIG. 8F shows the battery voltage.

At time t11, the ignition switch is operated and the engine 9 is cranked. The engine 9 is operated by the starter motor 11 at this time.

At time t12, cranking by the starter motor 11 ends and self-sustained rotation of the engine 9 is begun.

At time t13, the supply of fuel to the engine is stopped because idling stop control is initiated when the idling stop condition is fulfilled. Steering assistance is also prohibited (stopped).

At time t14, the engine rotation stops.

At time t15, when the idling stop cancel condition is fulfilled, for example, such as the pressing of the brake pedal being released, idling stop control is canceled, and the engine 9 is cranked by the starter motor 11. At this time, the bypass relay 31 is turned on (opened). The electric current flowing from the battery 15 to the starter motor 11 thereby passes through the resistor circuit 31*b*, and the instant drop in voltage at the start of cranking can be suppressed.

At time t16, when a predetermined time has elapsed after the start of cranking, the starter bypass relay 31 is switched from on (open) to off (closed). The resistor circuit 31*b* is thereby shorted, the electric current flowing from the battery 15 to the starter motor 11 passes through the relay circuit 31*a*, and the resistor circuit 31*b* can be kept from reaching a high temperature. Because the battery voltage decreases when the starter bypass relay 31 is switched from on (open) to off (closed), steering assistance continues to be prohibited (stopped) at the point in time of time t16.

At time t17, the battery voltage is at least a voltage that enables the assist motor 7 to generate assist torque, and steering assistance is therefore allowed (restarted).

At time t18, the engine speed is greater than the complete combustion determination speed (500 rpm), it is determined that the engine 9 has reached complete combustion, the starter motor 11 is stopped, and cranking is ended.

Effects

The effects of Embodiment 1 are described.

(3) The starter bypass relay 31 (circuit switching means or device) for increasing the resistance of the power supply circuit when the engine 9 startup is initiated and reducing the resistance of the power supply circuit after the elapse of a predetermined time following initiation of the engine 9 startup is disposed on the power supply circuit joining the battery 15 and the starter motor 11, and, after the initiation of engine startup and once the resistance of the power supply circuit has been switched by the starter bypass relay 31, the power steering control unit 19 determines that voltage fluctuation of the battery 15 is equal to or less than a predetermined voltage range when the voltage of the battery 15 is at least a predetermined voltage.

Consequently, the assist motor 7 is operated even while the starter motor 11 is operating (during cranking), and assist torque can therefore be quickly and stably outputted after idling stop control has been canceled.

Embodiment 2

In Embodiment 1, the starter bypass relay 31 is disposed between the battery 15 and the starter motor 11. In Embodiment 2, the battery 15 and the starter motor 11 are directly connected.

Figure 9:
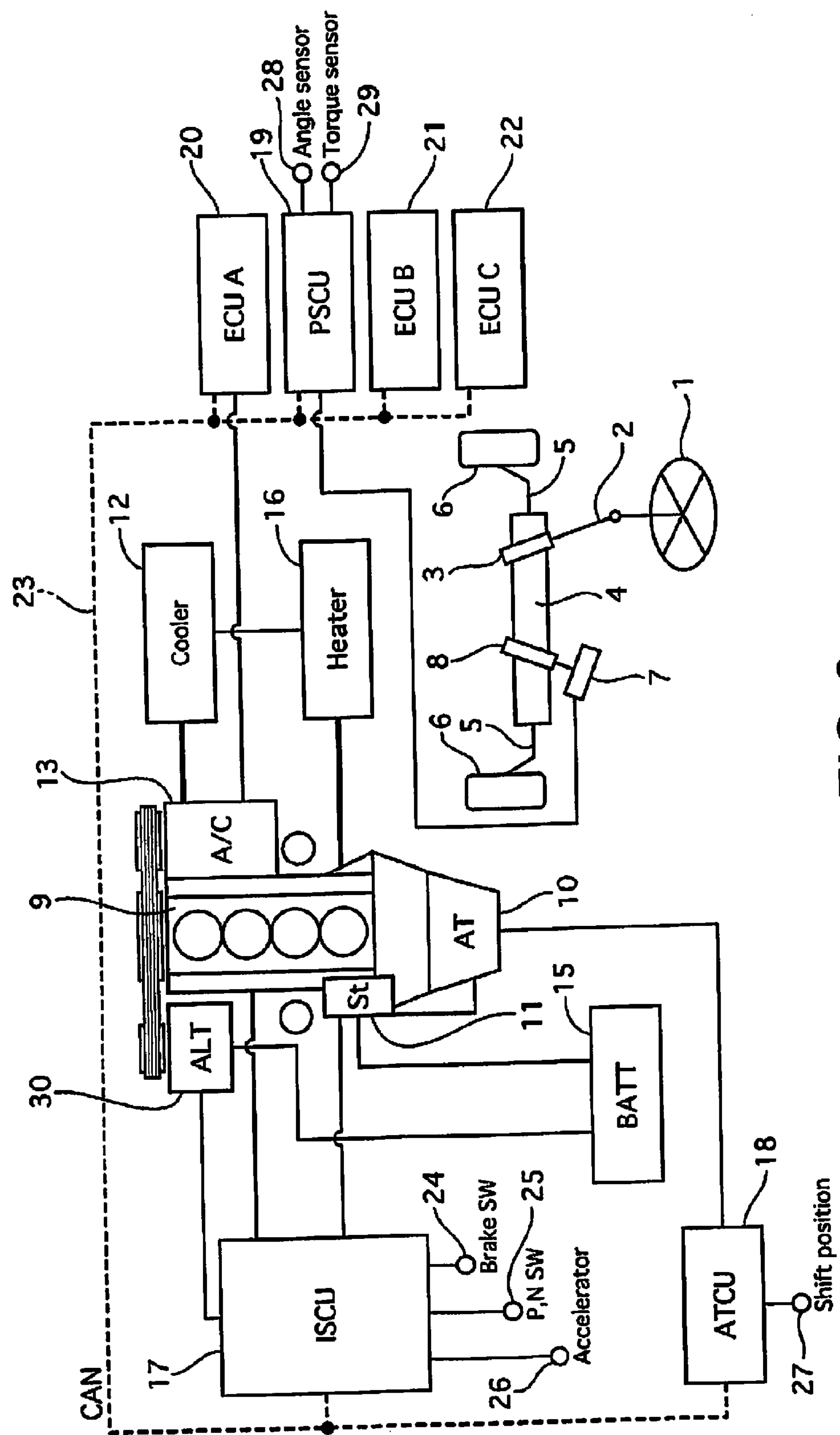
FIG. 9 is a schematic diagram of a vehicle system of Embodiment 2.

FIG. 9 is a schematic diagram of a vehicle system equipped with power steering and idling stop.

This vehicle system has, as a steering mechanism, a steering wheel 1, a steering shaft 2 connected to the steering wheel 1, a pinion 3 that rotates integrally with the steering shaft 2, a rack 4 for converting the rotational motion of the pinion 3 into linear motion in the vehicle width direction, tie rods 5 connected to both ends of the rack 4, and steered wheels 6 that are connected to the tie rods 5 and that perform steering in accordance with the steered amount of the steering wheel 1. The vehicle system also has, as a power-steering mechanism, an assist motor 7 for outputting assist torque that supplements the steering torque of the driver, and a pinion 8 that rotates integrally with a motor shaft of the assist motor 7 and meshes with the rack 4.

The vehicle system also has an engine 9 as a drive source, and the drive force of the engine 9 is outputted to an automatic transmission 10. The engine 9 includes a starter motor 11 for cranking the engine 9 when the engine starts up. Also included is a compressor 13 connected via a belt with a crankshaft of the engine 9. The compressor 13, which is operated by the engine 9, compresses a catalyst of a cooler 12 for sending cold air into a passenger compartment. Also included is an alternator 30 connected via a belt with the crankshaft of the engine 9. After engine startup, the alternator 30 is operated by the engine 9 to generate power. The engine 9 is connected to a heater 16 for sending hot air into the passenger compartment, and the heater 16 utilizes the heat of the engine 9.

The configuration of the control system includes an idling stop control unit 17, an automatic transmission control unit 18, and a power steering control unit 19. These along with other electronic control units 20, 21, 22 share information through a controller area network (CAN) 23.

Connected to the idling stop control unit 17 are a brake switch 24 for outputting information on whether or not a brake pedal is being operated, a PN switch 25 for outputting information on whether or not the shift position is P (park) or N (neutral), and an accelerator position sensor 26 for outputting information on an accelerator pedal position. An inhibitor switch 27 showing the shift position is connected to the automatic transmission control unit 18. Connected to the power steering control unit 19 are a steering angle sensor 28 for detecting the steering angle of the steering wheel 1, and a steering torque sensor 29 for detecting the steering torque inputted to the steering wheel 1.

Idling Stop Control

Figure 10:
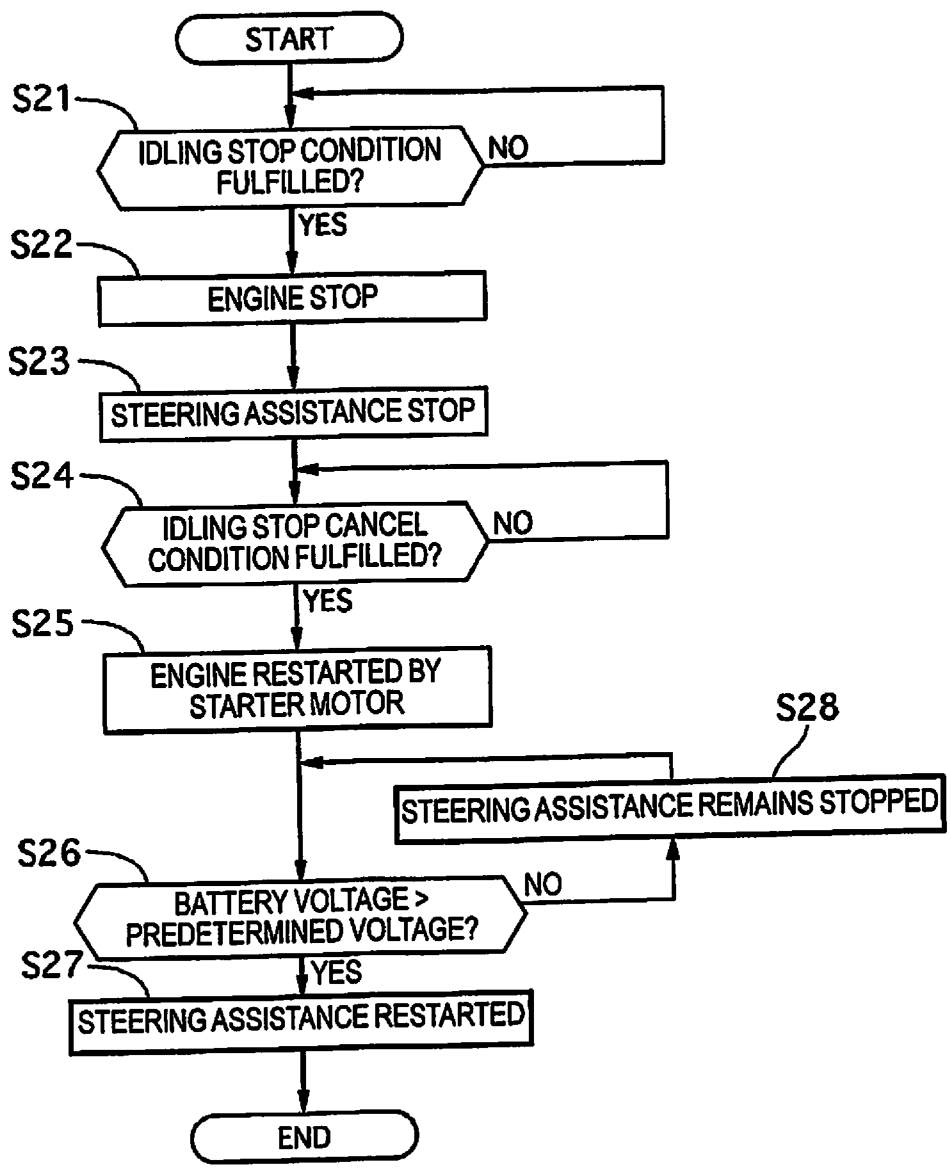
FIG. 10 is a flowchart illustrating the steps of Embodiment 2.

Next, idling stop control is described. FIG. 10 is a flowchart showing the flow of control performed in the idling stop control unit 17 and the power steering control unit 19.

In step S21, a determination is made as to whether or not a condition is fulfilled for stopping the engine and entering idling stop control. When the condition is fulfilled, the process advances to step S22, and when the condition is not fulfilled, the determination of step S21 is repeated until the condition is fulfilled. The idling stop condition includes conditions such as the vehicle speed being zero, the accelerator pedal position being zero, the brake pedal being pressed, the engine oil or transmission oil being at least a predetermined temperature, and the battery voltage being at least a predetermined voltage, and when these conditions are all fulfilled, the idling stop condition is fulfilled. Other conditions may be added to the idling stop condition, which is not particularly limited.

In step S22, the supply of fuel to the engine is stopped, and the process advances to step S23.

In step S23, the assist motor 7 stops generating assist torque (steering assistance stops), and the process advances to step S24.

In step S24, a determination is made as to whether or not an idling stop cancel condition is fulfilled. When the condition is fulfilled, the process advances to step S25, and when the condition is not fulfilled, the determination of step S24 is repeated until the condition is fulfilled. The idling stop cancel condition includes conditions such as the accelerator pedal position being greater than zero, the pressing of the brake pedal having been lessened, the engine oil or the transmission oil being less than a predetermined temperature, and the battery voltage being less than a predetermined voltage, and when any of these conditions is fulfilled, the idling stop cancel condition is fulfilled. Other conditions may be added to the idling stop cancel condition, which is not particularly limited.

In step S25, the engine 9 is cranked by the starter motor 11, and the process advances to step S26.

In step S26, a determination is made as to whether or not the battery voltage is at least a predetermined voltage. When the battery voltage is at least the predetermined voltage, the process advances to step S27, and when the battery voltage is less than the predetermined voltage, the process advances to step S28. The predetermined voltage in step S26 is set to a voltage that enables the assist motor 7 to generate assist torque.

In step S27, the assist motor 7 again begins to generate assist torque (steering assistance is restarted); and the process is ended.

In step S28, the assist motor 7 continues to not generate assist torque (steering assistance remains stopped), and the process advances to step S26.

Operation of Idling Stop Control Process

When the idling stop condition is fulfilled, the process advances from step S21 to step S22 and step S23, the supply of fuel to the engine is stopped, and steering assistance is stopped.

After the engine stop (idling stop), when the idling stop cancel condition is fulfilled, the process advances from step S24 to step S25, the starter motor 11 is operated, and the engine 9 is cranked.

Even after the idling stop cancel condition has been fulfilled, when the battery voltage is equal to or less than the predetermined voltage, the process advances from step S26 to step S28, and steering assistance remains stopped.

When the idling stop cancel condition is fulfilled and the battery voltage is greater than the predetermined voltage, the process advances from step S26 to step S27 and steering assistance is restarted.

Action

Due to steering assistance being stopped when the idling stop condition is fulfilled, power consumption of the battery 15 can be suppressed. Due to steering assistance being restarted when the idling stop is canceled, assist torque can be generated for the steering torque of the driver when travel is restarted.

When the idling stop condition is fulfilled, the engine 9 is started up by the starter motor 11. Although the battery voltage fluctuates widely immediately after the starter motor 11 cranks the engine 9, the fluctuation lessens as the battery voltage is restored, as shown in FIG. 7 of Embodiment 1. In other words, large voltage fluctuations do not occur while the battery voltage is being restored at times such as when the starter bypass relay 31 is switched from on (open) to off (closed), as in Embodiment 1.

In view of this, in Embodiment 2, steering assistance remains stopped when the battery voltage is less than the predetermined voltage, and steering assistance is restarted when the battery voltage is at least the predetermined voltage.

Effects

The effects of Embodiment 2 are described.

(4) After engine startup is initiated, when the voltage of the battery 15 is at least the predetermined voltage, the power steering control unit 19 determines that the voltage fluctuation of the battery 15 is equal to or less than the predetermined voltage range.

Consequently, the assist motor 7 is operated even while the starter motor 11 is operating (during cranking), and assist torque can therefore be quickly and stably outputted after idling stop control has been canceled.

Reference Example 2

In Embodiment 1, Reference Example 1, and Reference Example 2, after the engine is restarted, steering assistance is restarted after the battery voltage is restored to a voltage that enables the assist motor 7 to generate assist torque. In Reference Example 2, assist torque corresponding to the battery voltage is outputted even it is not possible for assist torque to be sufficiently generated by the assist motor 7.

A system in which the engine is restarted by the SSG 14 is described below, but this embodiment can be similarly carried out in a system in which the engine is restarted by the starter motor 11 with the starter bypass relay 31 of Embodiment 1, or system in which the engine is restarted by the starter motor 11 without the starter bypass relay 31 as in Embodiment 2.

In the following description, the system configuration is the same as that of Reference Example 1, and the same configurations are therefore denoted with the same symbols and are not described.

Idling Stop Control

Figure 11:
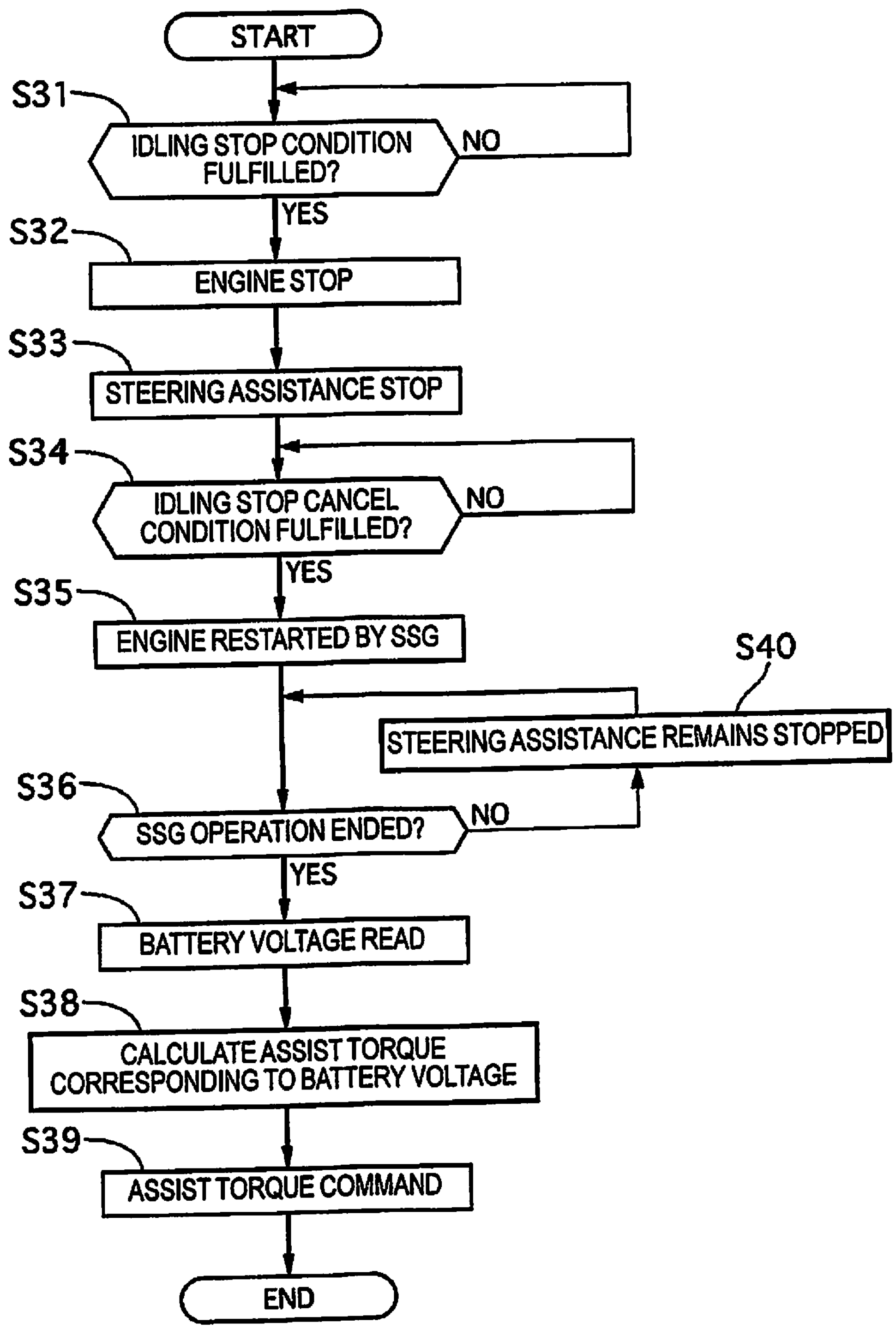
FIG. 11 is a flowchart of Reference Example 2.

Idling stop control is described. FIG. 11 is a flowchart showing the flow of control performed in the idling stop control unit 17 and the power steering control unit 19.

In step S31, a determination is made as to whether or not a condition is fulfilled for stopping the engine and entering idling stop control. When the condition is fulfilled, the process advances to step S32, and when the condition is not fulfilled, the determination of step S31 is repeated until the condition is fulfilled. The idling stop condition includes conditions such as the vehicle speed being zero, the accelerator pedal position being zero, the brake pedal being pressed, the engine oil or transmission oil being at least a predetermined temperature, and the battery voltage being at least a predetermined voltage, and when these conditions are all fulfilled, the idling stop condition is fulfilled. Other conditions may be added to the idling stop condition, which is not particularly limited.

In step S32, the supply of fuel to the engine is stopped, and the process advances to step S33.

In step S33, the assist motor 7 stops generating assist torque (steering assistance stops), and the process advances to step S34.

In step S34, a determination is made as to whether or not an idling stop cancel condition is fulfilled. When the condition is fulfilled, the process advances to step S35, and when the condition is not fulfilled, the determination of step S34 is repeated until the condition is fulfilled. The idling stop cancel condition includes conditions such as the accelerator pedal position being greater than zero, the pressing of the brake pedal having been lessened, the engine oil or the transmission oil being less than a predetermined temperature, and the battery voltage being less than a predetermined voltage, and when any of these conditions is fulfilled, the idling stop cancel condition is fulfilled. Other conditions may be added to the idling stop cancel condition, which is not particularly limited.

In step S35, the engine 9 is cranked by the SSG 14, and the process advances to step S36.

In step S36, a determination is made as to whether or not the operation of the SSG 14 has ended, or in other words, whether or not cranking of the engine 9 has ended. When the operation has ended, the process advances to step S37, and when the operation has not ended, the process advances to step S40. The determination of step S36 may be made in place of the determination of whether or not the battery voltage fluctuation is equal to or less than the predetermined fluctuation range. The predetermined fluctuation range is preferably set on the basis of the fluctuation range that occurs when the SSG 14 is operating.

In step S37, the battery voltage is read, and the process advances to step S38.

In step S38, an assist torque is calculated that corresponds to the battery voltage and that can be outputted by the assist motor 7, and the process advances to step S39. The process of step S38 is performed until the battery voltage is restored to a voltage that enables the assist motor 7 to generate assist torque corresponding to the steering maneuver performed by the driver. After the battery voltage has been restored to a voltage that enables the assist motor 7 to generate assist torque corresponding to the steering maneuver performed by the driver, the assist torque is calculated according to the steering maneuver performed by the driver.

In step S39, the assist motor 7 is instructed to output the calculated assist torque, and the process is ended.

In step S40, the assist motor 7 continues to not generate assist torque (steering assistance remains stopped), and the process advances to step S36.

Operation of Idling Stop Control Process

When the idling stop condition is fulfilled, the process advances from step S31 to step S32 and step S33, the supply of fuel to the engine is stopped, and steering assistance is stopped.

After the engine stop (idling stop), when the idling stop cancel condition is fulfilled, the process advances from step S34 to step S35, the SSG 14 is operated, and the engine 9 is cranked.

When the SSG 14 is operating even after the idling stop cancel condition has been fulfilled, the process advances from step S36 to step S40, and steering assistance remains stopped.

When operation of the SSG 14 has ended, the process advances from step S36 to step S37, step S38, and step S39, and assist torque corresponding to the battery voltage is outputted by the assist motor 7.

Action

Immediately after the engine is restarted (immediately after operation of the SSG 14 has ended), the battery voltage decreases and sufficient assist torque cannot be outputted by the assist motor 7. However, it is possible that the engine could have already restarted and the driver could begin steering. The reactive forces of both the road surface and steering are great when the vehicle is stopped or when the vehicle is moving at a low speed, and it is therefore preferable for assist torque to be outputted quickly by the assist motor 7 and for steering assistance to be performed for the steering of the driver.

In view of this, in Reference Example 2, when the voltage fluctuation of the battery 15 is equal to or less than the predetermined fluctuation range after engine startup, assist torque is calculated according to the battery voltage and the assist motor 7 is controlled so as to output the calculated assist torque. It is thereby possible for assist torque to be generated quickly although the assist torque is not great enough, and steering assistance can be performed for the steering of the driver.

Effects

The effects of Reference Example 2 are described.

(5) After engine startup and after the voltage fluctuation of the battery 15 has become equal to or less than the predetermined fluctuation range, the power steering control unit 19 calculates assist torque corresponding to the voltage of the battery 15 and controls the assist motor 7 so as to output the calculated assist torque.

Consequently, assist torque can be generated quickly, and steering assistance can be performed for the steering of the driver.

Other Embodiments

The present invention is not limited to the configurations of the above embodiments; other configurations can be adopted. For example, in Embodiment 1 and Reference Examples 1 through 3, the steering assistance is stopped with the engine stop initiation (idling stop initiation) being the point in time when the supply of fuel to the engine is stopped, but the steering assistance may be stopped with the engine stop initiation (idling stop initiation) being the point in time when the engine rotation stops.

Figure 12:
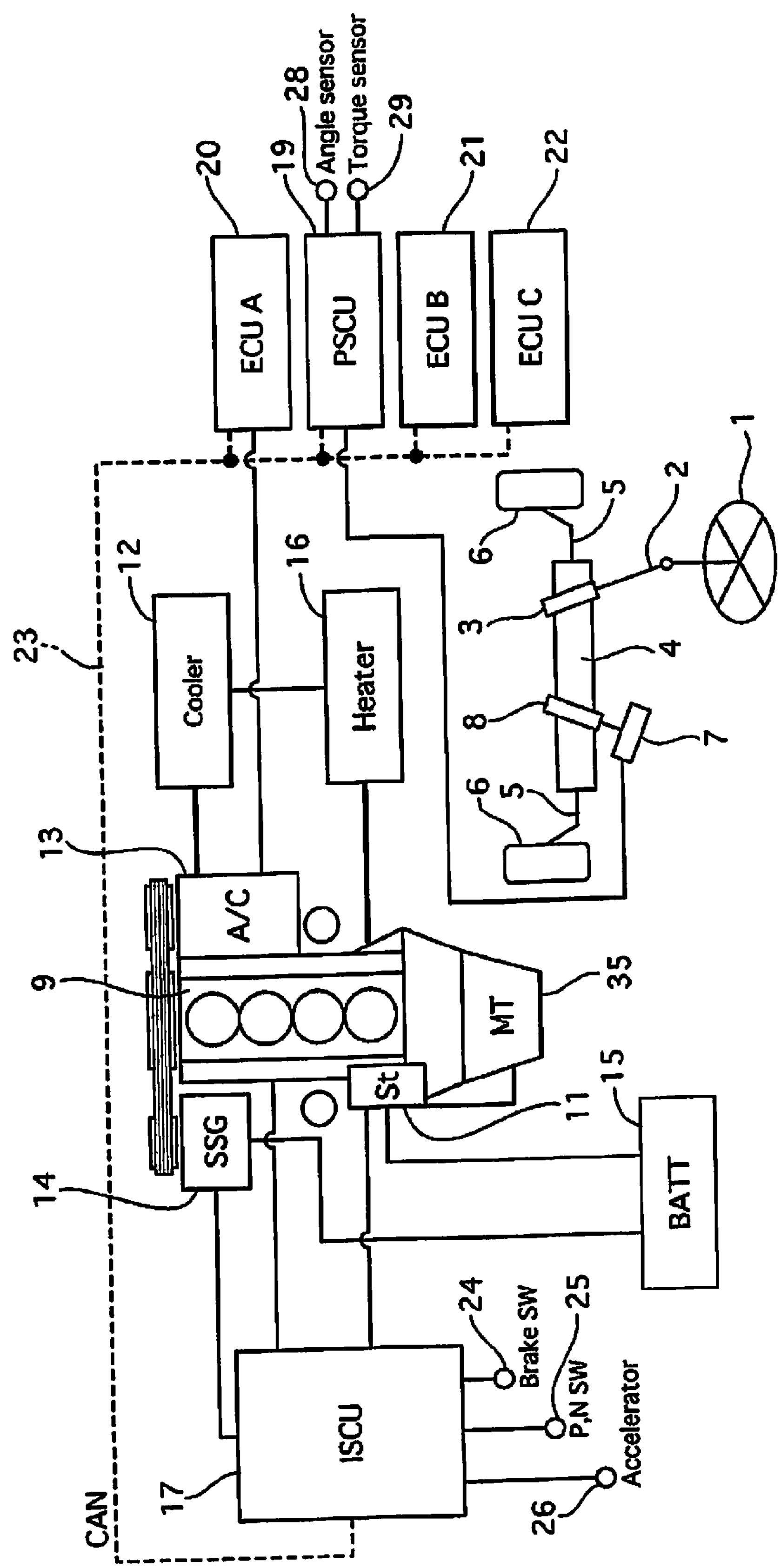
FIG. 12 is a schematic diagram of a vehicle system of another embodiment.
Figure 13:
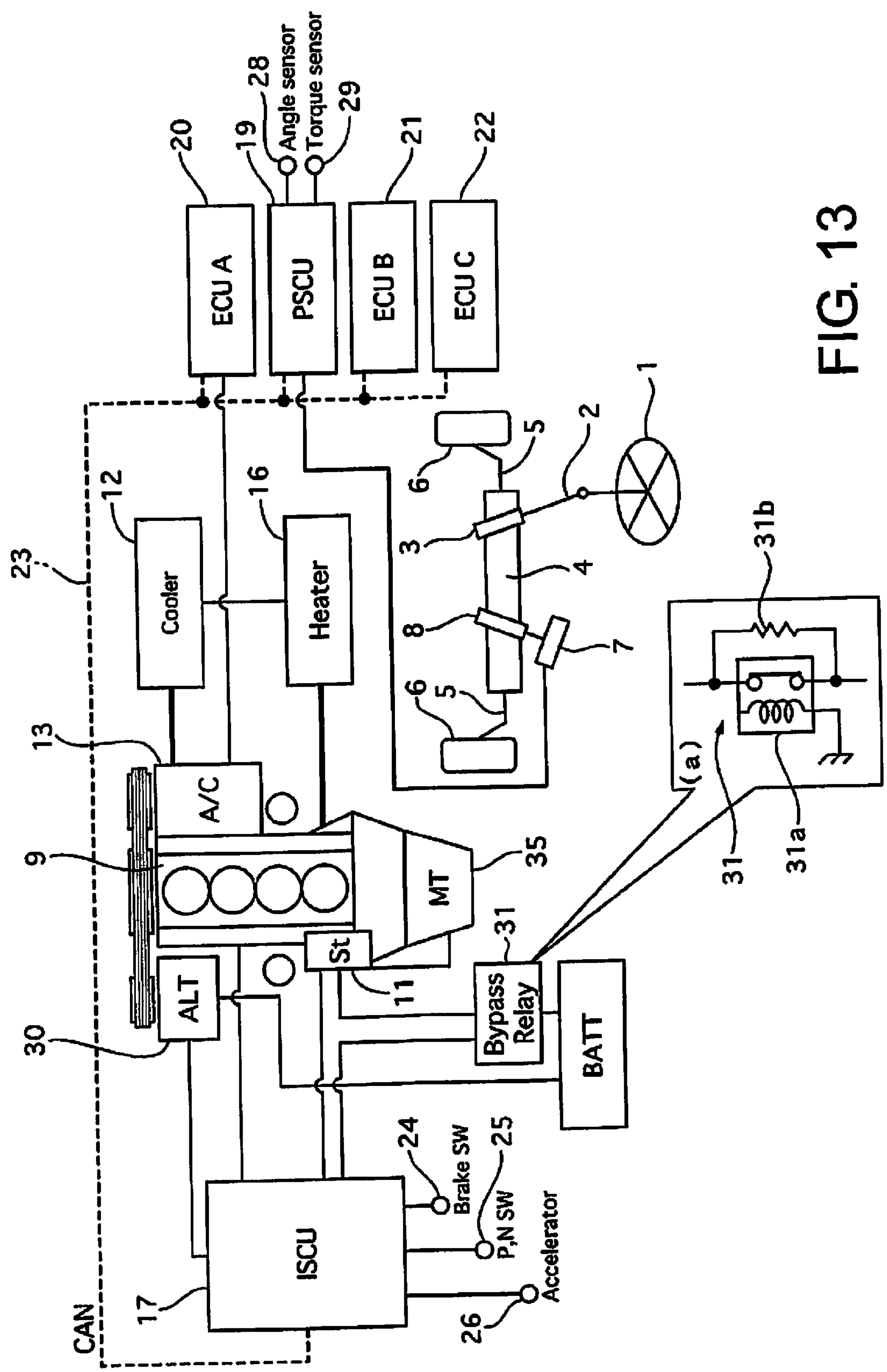
FIG. 13 is a schematic diagram of a vehicle system of another embodiment.
Figure 14:
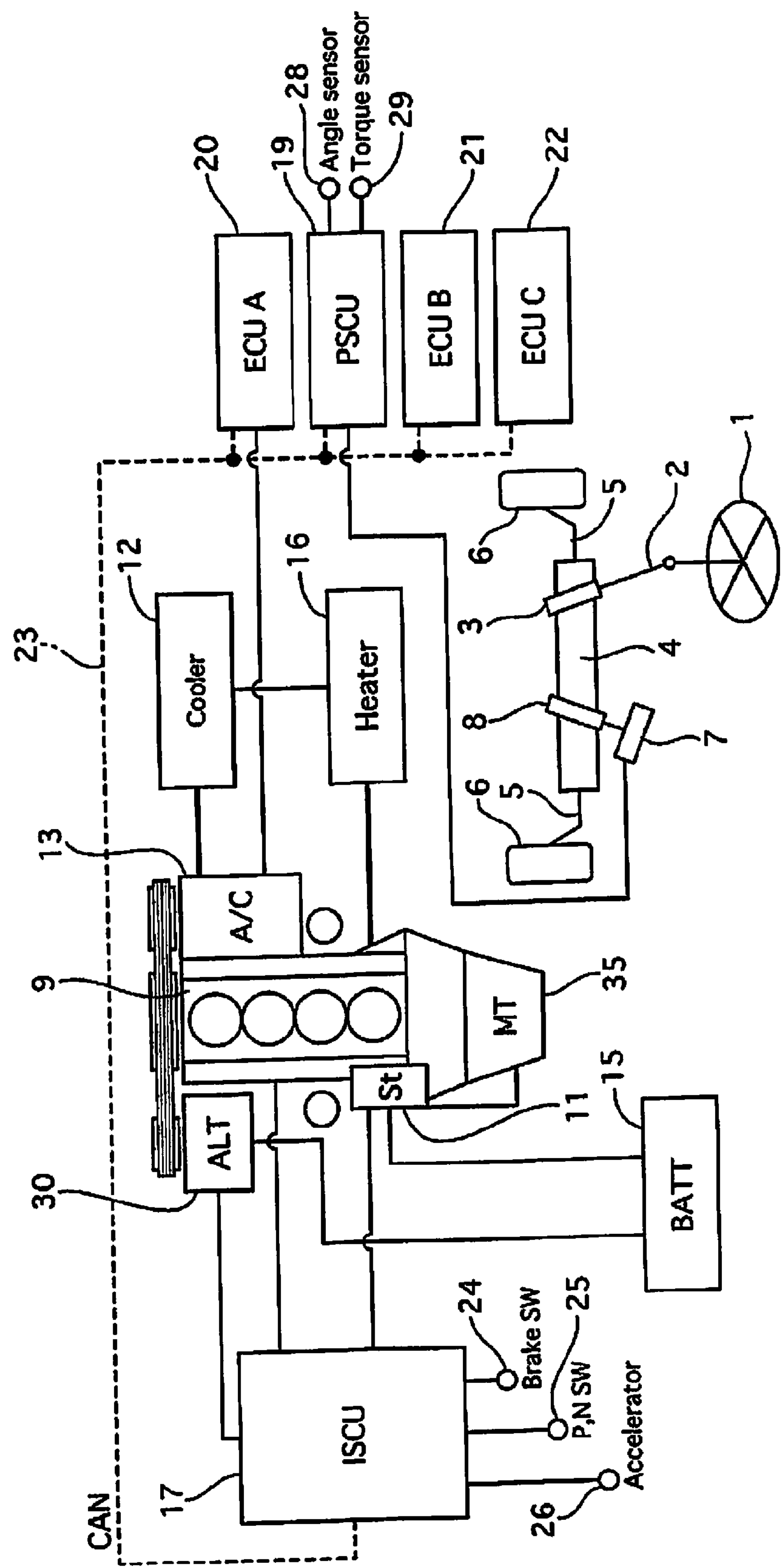
FIG. 14 is a schematic diagram of a vehicle system of another embodiment.

In Embodiment 1 and Reference Examples 1 through 3, systems equipped with the automatic transmission 10 are described, but the present invention may also be applied to a system equipped with a manual transmission 35 as shown in FIGS. 12 to 14.

In the case of a manual transmission, connected to the idling stop control unit 17 are a neutral switch 32 for outputting whether or not a shift lever is in a neutral position, a lower clutch switch 33 for detecting that a lower clutch has been released (disengaged), and an upper clutch switch 34 for detecting that an upper clutch is engaged (coupled). The lower clutch switch 33 outputs an on signal when the pressed amount of a clutch pedal is below a half clutch starting point. The upper clutch switch 34 outputs an on signal when the pressed amount of the clutch pedal is above the half clutch starting point.

The invention claimed is:

1. A vehicle control device comprising:

a power-steering mechanism configured to impart assist torque to steering torque applied by a driver during a maneuver performed by the driver;

an engine starter motor/generator configured to use battery power to start up an engine;

a controller configured to stop the engine when the vehicle stops and restart the engine when the vehicle begins to move;

a power-steering controller programmed to control the power-steering mechanism so as to generate the assist torque corresponding to the steering maneuver performed by the driver; and a circuit switching device that, when engine startup is initiated, is turned on to increase the resistance of a power supply circuit joining the battery power and the engine starter motor/generator, and, after a predetermined time has elapsed once the engine startup is initiated, is turned off to reduce the resistance of the power supply circuit, the circuit switching device being disposed on the power supply circuit;

the power-steering controller being programmed to:

cause generation of the assist torque through the power-steering mechanism to be stopped when the engine has stopped, and, when the engine is restarted, determine that a battery voltage has reached at least a predetermined voltage after the circuit switching device has been turned off, and cause the power-steering mechanism to be reactivated upon determining that the battery voltage has reached at least the predetermined voltage after the circuit switching device has been turned off, the predetermined voltage being a voltage at which the power-steering mechanism normally operates.

2. The vehicle control device according to claim 1, wherein after the engine has started up and the battery voltage has reached at least the predetermined voltage, the power-steering controller is programmed to calculate the assist torque in accordance with the battery voltage and control the power-steering mechanism so as to output the calculated assist torque.

3. The vehicle control device according to claim 1, wherein the power-steering controller is programmed to determine that the battery voltage has reached at least the predetermined voltage when a fluctuation of the battery voltage after the circuit switching device has been turned off is less than or equal to a predetermined voltage fluctuation.

* * * * *